United States Patent [19]
Iwai et al.

[11] Patent Number: 5,950,937
[45] Date of Patent: Sep. 14, 1999

[54] ALUMINA-ZIRCONIA SINTERED BODY, PRODUCTION THEREOF, AND IMPACT GRINDER USING SAID ALUMINA-ZIRCONIA SINTERED BODY

[75] Inventors: Akihito Iwai; Hiroshi Wada, both of Hitachinaka; Katsumi Matsumoto, Hitachi; Sosuke Naito, Minoo; Yoshihiko Imai, Anjo; Hideki Nakamura, Takaishi; Hiroaki Tanaka, Osaka, all of Japan

[73] Assignees: Hitachi Chemical Co., Ltd., Tokyo; Kansai Matec Co., Ltd., Osaka, both of Japan

[21] Appl. No.: 09/197,535

[22] Filed: Nov. 23, 1998

Related U.S. Application Data

[62] Division of application No. 08/790,313, Jan. 28, 1997, Pat. No. 5,877,105.

[30] Foreign Application Priority Data

Jan. 29, 1996 [JP] Japan ................................. 8-012692
Dec. 4, 1996 [JP] Japan ................................. 8-323644

[51] Int. Cl.⁶ ..................................................... B02C 13/28
[52] U.S. Cl. ........................ 241/27; 241/188.2; 241/195; 241/291
[58] Field of Search .............................. 501/105; 241/27, 241/188.2, 195, 291, 296

[56] References Cited

U.S. PATENT DOCUMENTS

| | | | |
|---|---|---|---|
| 4,829,028 | 5/1989 | Seki et al. | 501/105 |
| 5,711,492 | 1/1998 | Cheladze | 241/291 |

FOREIGN PATENT DOCUMENTS

| | | |
|---|---|---|
| 0291029 | 12/1988 | European Pat. Off. . |
| 60-24621 | 12/1985 | Japan . |

OTHER PUBLICATIONS

Patent Abstracts of Japan, vol. 013, No. 262, Jun. 16, 1989 & JP 01 065067 (Iwao Jiki Kogyo KK.).
Patent Abstracts of Japan, vol. 096, No. 002, Feb. 29, 1996 & JP 07 286166 A (Showa Denko KK.).
Database WPI, week 8314, Derwent Publications Ltd., London, GB; & JP 58 032 066 (NGK Spark Plug Co., Ltd.), Feb. 24, 1983.

*Primary Examiner*—Mark Rosenbaum
*Attorney, Agent, or Firm*—Antonelli, Terry, Stout & Kraus, LLP

[57] ABSTRACT

An alumina-zirconia sintered body comprising 92 to 35% by weight of aluminum oxide and 8 to 65% by weight of zirconium oxide having mainly tetragonal system, and 0.2 to 5 parts by weight of silicon oxide per 100 parts by weight of the total of aluminum oxide and zirconium oxide, and having a relative density of 95% or more, has improved wear resistance and suitable for use in an impact grinder.

10 Claims, No Drawings

ALUMINA-ZIRCONIA SINTERED BODY, PRODUCTION THEREOF, AND IMPACT GRINDER USING SAID ALUMINA-ZIRCONIA SINTERED BODY

This application is a Divisional application of application Ser. No. 08/790,313, filed Jan. 28, 1997. Now U.S. Pat No. 5,877,105.

BACKGROUND OF THE INVENTION

The present invention relates to an alumina-zirconia sintered body, a process for production thereof, and an impact grinder using said alumina-zirconia sintered body.

Alumina-zirconia type sintered bodies are known to have a high strength, a high toughness and a high abrasion resistance. U.S. Pat. No. 4,316,964, JP-B 59-24751, JP-B 61-59265, etc. disclose that an alumina-zirconia sintered body can be made into a high-strength high-toughness sintered body by converting the zirconium oxide (hereinafter, referred to as $ZrO_2$) present in the sintered body into a tetragonal crystal.

Even such a type of sintered bodies, however, cannot exhibit a sufficiently high abrasion resistance when the sintered body is put to use under severe abrasive conditions and particularly to uses in which particles collide with a great impact force.

Thus, as a method for improving abrasion resistance, methods for controlling the growth of particles by the use of a sintering assistant have been proposed. For example, JP-A 64-65067 has disclosed a method of using feldspar and kaolinite in combination as a sintering assistant. However, this method is disadvantageous in that feldspar involves alkali metal or alkaline earth metal which affects the stability of $ZrO_2$, so that a sintered body of high abrasion resistance can be obtained by carrying out the calcining carefully.

SUMMARY OF THE INVENTION

It is an object of the present invention to provide an alumina-zirconia sintered body improved in abrasion resistance.

It is another object of the present invention to provide a process for producing an alumina-zirconia sintered body improved in abrasion resistance.

It is yet another object of the present invention to provide an impact grinder improved in abrasion resistance.

The present invention provides an alumina-zirconia sintered body comprising 92–35% by weight of aluminum oxide (hereinafter referred to as $Al_2O_3$) and 8–65% by weight of zirconium oxide ($ZrO_2$) of which crystal system is predominantly tetragonal, and 0.2–5 parts by weight of silicon oxide (hereinafter referred to as $SiO_2$) per 100 parts by weight of the total of $Al_2O_3$ and $ZrO_2$, and having a relative density of 95% or more.

Further, the present invention provides a process for producing an alumina-zirconia sintered body having a relative density of 95% or above which comprises mixing together an $Al_2O_3$ powder, a $ZrO_2$ powder, a stabilizer for these powders and kaolinite at a ratio capable of giving the above-mentioned formulation after calcination, followed by calcining the mixture.

Further, the present invention provides an impact grinder comprising a cylinder and a plurality of pins fixed on a rotating plate (shaft) rotating at a high speed in the cylinder so as to pulverize and mix a powdery material by collision against the inner wall of cylinder and the pins, wherein the portions of the inner wall of cylinder coming into contact with the powdery material and/or the pins are made of the above-mentioned alumina-zirconia sintered body.

DESCRIPTION OF THE PREFERRED EMBODIMENTS

In the present invention, it is preferable that 80% by weight or more of the $Al_2O_3$ in the alumina-zirconia sintered body is occupied by α-$Al_2O_3$ crystal phase. Although the mean crystal particle diameter thereof is not particularly limited, it is preferably 0.6–3 μm and further preferably 0.7–2.5 μm. An alumina-zirconia sintered body of which mean crystal particle diameter is greater than 3 μm tends to be low in abrasion resistance. An alumina-zirconia sintered body of which mean crystal diameter is smaller than 0.6 μm is difficult to produce and tends to be expensive.

In the present invention, that the crystal system of $ZrO_2$ is predominantly tetragonal means that at least ½ of the $ZrO_2$ crystal phase is occupied by tetragonal crystal. That is to say, in the $ZrO_2$ crystal system of the present invention, the $ZrO_2$ crystal phase preferably contains tetragonal $ZrO_2$ crystal in a proportion of 50% by weight or more. If the proportion of tetragonal $ZrO_2$ crystal is smaller than 50% by weight, there is a tendency of decreasing abrasion resistance. The crystal system of $ZrO_2$ can be investigated by directly examining the surface of alumina-zirconia sintered material by the X ray diffraction method and calculating the content from the diffraction diagram. The crystal system can be converted to tetragonal $ZrO_2$ by adding an appropriate quantity of at least one rare earth element oxide such as yttrium oxide (hereinafter referred to as $Y_2O_3$), cerium oxide (hereinafter referred to as $CeO_2$) or the like as a stabilizer.

The proportions of $Al_2O_3$ and the predominantly tetragonal $ZrO_2$ crystal in the alumina-zirconia sintered body are as follows. That is, the proportion of $Al_2O_3$ is 92–35% by weight, preferably 90–40% by weight, and more preferably 70–50% by weight; and the proportion of the $ZrO_2$ crystal (predominantly tetragonal) is 8–65% by weight, preferably 10–60% by weight, and more preferably 30–50% by weight. When the proportion of $Al_2O_3$ is out of the range of 92–35% by weight or when the proportion of the $ZrO_2$ (predominantly tetragonal) is out of the range of 8–65% by weight, abrasion resistance becomes low.

The $SiO_2$ in the alumina-zirconia sintered body can be present in various states, such as crystalline phase (for example, mullite and the like), glass phase, etc., depending on the difference in formulation of sintered body, temperature of calcining, etc. Whatever the state of $SiO_2$ is, however, the state of $SiO_2$ by no means limits the present invention. The proportion of $SiO_2$ is in the range of 0.2–5 parts by weight and preferably 0.5–2.5 parts by weight per 100 parts by weight of the total of $Al_2O_3$ and the predominantly tetragonal $ZrO_2$. When the proportion of $SiO_2$ is out of 0.2–5 parts by weight, abrasion resistance becomes low.

It is necessary in the present invention that the relative density of the alumina-zirconia sintered body is 95% or more and preferably 97% or more. If the relative density is lower than 95%, abrasion resistance becomes low. As used herein, the term "relative density" means a value obtained by dividing the bulk density of sintered body determined by water-substitution method by the theoretical density. Originally, a theoretical density must be determined from respective theoretical densities of the phases constituting a sintered body and constitution of the sintered body. Herein, however, theoretical density is calculated according to the following formula for convenience:

Theoretical density(g/cm$^3$)=100/($R_A$/4+$R_Z$/6+$R_S$/2.2)

wherein $R_A$ is proportion of $Al_2O_3$ (unit: % by wt.)
$R_B$ is proportion of $ZrO_2$ (unit: % by wt.)
$R_S$ is proportion of $SiO_2$ (unit: % by wt.)

When the kaolinite used in the present invention is heated in itself alone, it changes to metakaolin and then to a phase which is considered γ-alumina or Si—Al spinel, as intermediate phases, and finally to mullite and cristobalite. These intermediate phases have a high activity because of fine and irregular crystal structure. That is, when kaolinite is added to a powdery mixture comprising $Al_2O_3$, $ZrO_2$ and a stabilizer, the intermediate phases having a high activity function as a sintering assistant in the process of calcining to lower the temperature of calcining, make finer the crystal particles and improve the abrasion resistance.

Kaolinite is a clay mineral which is theoretically expressed by the formula $Al_2Si_2O_5(OH)_4$. Actually, however, the kaolinite used in the present invention is a natural product which may be somewhat different from the above in chemical composition, or may contain a small quantity of impurities. Further, in some cases, the used kaolinite may contain the above-mentioned intermediate phases. Such kaolinites are also usable in the present invention.

As the $Al_2O_3$ powder, those having various crystal structures such as α-alumina, γ-alumina and the like can be used. In the present invention, however, it is preferable to use an $Al_2O_3$ powder of which 80% by weight or more is occupied by α-alumina.

The $ZrO_2$ powder is put to use after being mixed with a stabilizer for the purpose of making tetragonal crystal phase occupy 50% by weight or more of $ZrO_2$ crystal phase after the calcining treatment.

As the $ZrO_2$ powder, any $ZrO_2$ powders may be used so far as 50% by weight or more of the crystal phase thereof is occupied by tetragonal crystal after the calcining treatment. As to the crystal structure thereof, any of monoclinic $ZrO_2$ powder and tetragonal $ZrO_2$ powder may be used. From the viewpoint of workability, however, the use of monoclinic $ZrO_2$ powder is preferable. When a tetragonal $ZrO_2$ powder is to be used, it is necessary to prepare the tetragonal $ZrO_2$ by once adding a stabilizer to a monoclinic $ZrO_2$, homogenizing the mixture and heat-treating the mixture to convert it into a tetragonal structure. This increases the number of steps and enhances the cost. When a monoclinic $ZrO_2$ powder is used, a monoclinic $ZrO_2$ and a stabilizer are mixed together, the mixture is further mixed with $Al_2O_3$ and kaolinite, and the resulting mixture is calcined; or $Al_2O_3$, monoclinic $ZrO_2$, a stabilizer and kaolinite are mixed together simultaneously and calcined. By these procedures, the crystal phase of $ZrO_2$ can be converted to a predominantly tetragonal structure.

In the present invention, the compounding ratio before the calcining treatment cannot be mentioned decisively, because kaolinite used as one of the ingredients changes its composition during the calcining via intermediate phases such as metakaolin, Y-alumina, Si—Al spinel, etc. and finally to mullite and cristobalite. Accordingly, the compounding ratio before the calcining must be roughly calculated based on the components contained in kaolinite.

The compounding ratios of the ingredients before the calcining treatment calculated by the above-mentioned method are preferably as follows: $Al_2O_3$ 90.3–30.8 parts by weight, $ZrO_2$ 8–65 parts by weight, and kaolinite 0.43–10.74 parts by weight per 100 parts by weight of the total of $Al_2O_3$, $ZrO_2$ and kaolinite.

The method for mixing together $Al_2O_3$ powder, $ZrO_2$ powder, stabilizer for these materials and kaolinite is not particularly limited. Preferably, the mixing is carried out by the use of a mixing apparatus such as ball mill, sand grinder and the like.

As methods for the calcining, pressureless sintering (calcining under atmospheric pressure), calcining by hot pressing, HIP (hot isostatic pressing) and the like can be used. In the present invention, calcining under atmospheric pressure is preferable from the viewpoint of manufacturing cost. Although the calcining temperature may be appropriately decided in accordance with compounding ratio and method of calcining, it is preferable to carry out the calcining at a temperature of 1,400° C. to 1,600° C. If the temperature of calcining is lower than 1,400° C., there is a tendency that the relative density of the resulting alumina-zirconia sintered body cannot be 95% or above or the crystal phase of $ZrO_2$ cannot be predominantly tetragonal. If the temperature of calcining exceeds 1,600° C., abrasion resistance of the sintered material tends to decrease.

In an impact grinder equipped with a cylinder and a plurality of pins fixed on a rotating plate (or shaft) rotating at a high speed in the cylinder and having the so-called rotational mechanism in which a powdery material is made to collide against the inner wall of the cylinder and the pins and thereby is pulverized and mixed, the alumina-zirconia sintered body of the present invention can be used as a material constructing the parts coming into contact with the powdery material of the inner wall of the cylinder and/or the pins.

As used in the present invention, the term "powdery material" means an assembly of particles and includes crushed stones, sand, dusts, fine powders, etc., regardless of the kind, size and shape of the particle.

The present invention is illustrated by way of the following Examples.

EXAMPLES 1–9 AND COMPARATIVE EXAMPLES 1–5

An intermediate $ZrO_2$ mixture powder was prepared by weighing out 93.5% by mole of a monoclinic $ZrO_2$ powder (manufactured by Daiichi Kigenso Co., Ltd., trade name SPZ), 5% by mole of $CeO_2$ powder (manufactured by Shin-Etsu Chemical Industry Co., Ltd., purity 99.9%) and 1.5% by mole of $Y_2O_3$ powder (manufactured by Shin-Etsu Chemical Industry Co., Ltd., purity 99.9%), the $CeO_2$ and the $Y_2O_3$ being both used as a stabilizer, followed by pulverizing the powders in wetness by means of a ball mil until the mean particle diameter reached 0.7 μm or less, mixing together the pulverized powders, and drying the powder mixture at a temperature of 105° C.

The intermediate $ZrO_2$ mixture powder obtained above, an $Al_2O_3$ powder (manufactured by Sumitomo Chemical Co., Ltd., trade name AES12, α-alumina) and kaolinite (produced in New Zealand, premium grade) were weighed out at the compounding ratios shown in Table 1 and Table 2, and each compounded mixture was pulverized in wetness and homogenized by means of a ball mill until the mean particle diameter reached 0.7 μm or less. The compounded mixture (slurry) was mixed with 2 parts by weight of polyvinyl alcohol (PVA) and spray-dried to obtain a molding powder. The molding powder was formed by means of a rubber press under a pressure of 150 MPa and then calcined for 3 hours in the atmospheric air at the temperature shown in Table 1 and Table 2 to prepare alumina-zirconia sintered bodies.

TABLE 1

| | Compounding ratio (parts by weight) | | | |
|---|---|---|---|---|
| | $Al_2O_3$ powder | Intermediate $ZrO_2$ mixture powder | Kaolinite | Calcining temperature (° C.) |
| Comparative Example 1 | 100 | 0 | 0 | 1600 |
| Comparative Example 2 | 60 | 40 | 0 | 1600 |
| Example 1 | 59.8 | 40 | 0.4 | 1550 |
| Example 2 | 59.6 | 40 | 1.0 | 1520 |
| Example 3 | 59.2 | 40 | 2.1 | 1500 |
| Example 4 | 58.1 | 40 | 5.2 | 1470 |
| Example 5 | 56.1 | 40 | 10.4 | 1450 |

TABLE 2

| | Compounding ratio (parts by weight) | | | |
|---|---|---|---|---|
| | $Al_2O_3$ powder | Intermediate $ZrO_2$ mixture powder | Kaolinite | Calcining temperature (° C.) |
| Comparative Example 3 | 53.8 | 40 | 16.7 | 1450 |
| Comparative Example 4 | 94.2 | 5 | 2.1 | 1500 |
| Example 6 | 89.2 | 10 | 2.1 | 1500 |
| Example 7 | 69.2 | 30 | 2.1 | 1500 |
| Example 8 | 49.2 | 50 | 2.1 | 1500 |
| Example 9 | 39.2 | 60 | 2.1 | 1500 |
| Comparative Example 5 | 19.2 | 80 | 2.1 | 1500 |

Subsequently, each alumina-zirconia sintered body obtained above was set to an impact grinder having a rotational mechanism (Ceramics Cage Mill manufactured by Kansai Matec Co., Ltd., model IB4-18) as the pulverizing pins, each having an inner diameter of 17 mm, an outer diameter of 32 mm and a length of 71 mm, of the rotating shaft. Further, the sintered material was pasted onto the inside wall of the cylinder as a plurality of pulverizing liners, each having a thickness of 12 mm. Then, the mill was worked at a circumferential speed of 25 m/second while feeding 1,000 kg of siliceous sand having a particle diameter of 10 mm or less at a feeding rate of 200 kg/hour, to pulverize the siliceous sand. After the pulverization, the abrasion losses of the pulverizing pins and the pulverizing liners were measured, from which the abrasion volume was determined. The results are summarized in Tables 3 and 4, wherein the abrasion volume is expressed in terms of relative value, taking the abrasion volume in Comparative Example 1 as 1.

The chemical formulation of the alumina-zirconia sintered body was determined by means of a fluorescent X ray analyzer, from which the relative density was calculated in the above-mentioned manner.

Further, the surface of the alumina-zirconia sintered body was ground with diamond paste, the ground surface was examined with an X ray diffraction apparatus. In case of tetragonal-cubic crystal, the content of tetragonal crystal was determined on plane A, and the content of cubic crystal was determined on plane B. In case of tetragonal-monoclinic crystal, the content of tetragonal crystal was determined on plane C, and the content of monoclinic crystal was determined on planes D and C, from which the content of tetragonal $ZrO_2$ was determined. The planes A, B, C and D are as mentioned below:

Plane A=Plane (022)

Plane B=Plane (220)

Plane C=Plane (111)

Plane D=Plane (11$\bar{1}$)

The results are summarized in Tables 3 and 4.

TABLE 3

| | Comparative Example 1 | Comparative Example 2 | Example 1 | Example 2 | Example 3 | Example 4 | Example 5 |
|---|---|---|---|---|---|---|---|
| Composition of Alumina-Zirconia sintered body (parts by weight) | | | | | | | |
| $Al_2O_3$ | 100 | 60 | 60 | 60 | 60 | 60 | 60 |
| $ZrO_2$ | 0 | 40 | 40 | 40 | 40 | 40 | 40 |
| $SiO_2$ | 0 | 0 | 0.2 | 0.5 | 1 | 2.5 | 5 |
| Content of tetragonal $ZrO_2$ crystal in $ZrO_2$ crystal (%) | 0 | 98 | 96 | 95 | 94 | 92 | 90 |
| Relative density (%) | 98.2 | 98.0 | 97.7 | 98.4 | 98.3 | 97.9 | 97.1 |
| Abrasion volume of pins | 1 | 0.49 | 0.40 | 0.34 | 0.30 | 0.32 | 0.41 |
| Abrasion volume of liners | 1 | 0.74 | 0.56 | 0.50 | 0.53 | 0.47 | 0.57 |

TABLE 4

|  | Comparative Example 3 | Comparative Example 4 | Example 6 | Example 7 | Example 8 | Example 9 | Comparative Example 5 |
|---|---|---|---|---|---|---|---|
| Composition of Alumina-Zirconia sintered body (parts by weight) | | | | | | | |
| $Al_2O_3$ | 60 | 95 | 90 | 70 | 50 | 40 | 20 |
| $ZrO_2$ | 40 | 5 | 10 | 30 | 50 | 60 | 80 |
| $SiO_2$ | 8 | 1 | 1 | 1 | 1 | 1 | 1 |
| Content of tetragonal $ZrO_2$ crystal in $ZrO_2$ crystal (%) | 90 | 94 | 94 | 94 | 94 | 94 | 94 |
| Relative density (%) | 97.2 | 97.5 | 97.6 | 98.0 | 98.1 | 98.3 | 98.1 |
| Abrasion volume of pins | 0.66 | 0.53 | 0.40 | 0.32 | 0.30 | 0.39 | 0.48 |
| Abrasion volume of liners | 0.97 | 0.79 | 0.60 | 0.48 | 0.44 | 0.58 | 0.70 |

EXAMPLES 10–12 AND COMPARATIVE EXAMPLE 6

The same $ZrO_2$ powder, $CeO_2$ powder and $Y_2O_3$ powder as used in Example 1 were weighed out at the compounding ratio shown in Table 5, and the mixture thereof was pulverized in wetness with a ball mill until the mean particle diameter reached 0.7 μm or less, homogenized and then dried at 105° C. to prepare an intermediate $ZrO_2$ mixture powder.

Then, 40 parts by weight of the intermediate $ZrO_2$ mixture powder obtained above was mixed with 59.2 parts by weight of $Al_2O_3$ powder and 2.1 parts by weight of kaolinite, both the same as those used in Example 1, and the mixture was pulverized in wetness by means of a ball mill until the mean particle diameter reached 0.7 μm or less, and homogenized. The mixture thus obtained (slurry) was mixed with 2 parts by weight of PVA, and the resulting mixture was spray-dried to obtain a molding powder. The molding powder was formed by means of a rubber press under a pressure of 150 MPa and calcined for 3 hours in the presence of atmospheric air at a temperature shown in Table 5 to obtain an alumina-zirconia sintered body.

TABLE 5

|  | Compounding ratio of intermediate $ZrO_2$ mixture powder (% by mole) | | | Calcining temperature (° C.) |
|---|---|---|---|---|
|  | $ZrO_2$ powder | $CeO_2$ powder | $Y_2O_3$ powder | |
| Example 10 | 93.5 | 5 | 1.5 | 1500 |
| Example 11 | 88 | 12 | 0 | 1500 |
| Example 12 | 97 | 0 | 3 | 1500 |
| Comparative Example 6 | 100 | 0 | 0 | 1500 |

Subsequently, composition of the alumina-zirconia sintered body, content of tetragonal $ZrO_2$ crystal, relative density, and abrasion volume were measured in the same manner as in Example 1. The results are summarized in Table 6.

TABLE 6

|  | Example 10 | Example 11 | Example 12 | Comparative Example 6 |
|---|---|---|---|---|
| Composition of Alumina-Zirconia sintered body (parts by weight) | | | | |
| $Al_2O_3$ | 60 | 60 | 60 | 60 |
| $ZrO_2$ | 40 | 40 | 40 | 40 |
| $SiO_2$ | 1 | 1 | 1 | 1 |
| Content of tetragonal $ZrO_2$ crystal in $ZrO_2$ crystal (%) | 94 | 95 | 93 | 0 |
| Relative density (%) | 98.3 | 97.8 | 97.3 | (Note 1) |
| Abrasion volume of pins | 0.30 | 0.40 | 0.38 | (Note 1) |
| Abrasion volume of liners | 0.45 | 0.60 | 0.56 | (Note 1) |

(Note 1) Unmeasurable due to destruction of the alumina-zirconia sintered body

EXAMPLES 13–16 AND COMPARATIVE EXAMPLE 7

The intermediate $ZrO_2$ mixture powder obtained in Example 1 and the same $Al_2O_3$ powder and kaolinite as used in Example 1 were weighed out at a compounding ratio shown in Table 7, and the mixture thereof was pulverized in wetness with a ball mill until the mean particle diameter reached 0.7 μm or less, and homogenized. The mixture thus obtained (slurry) was mixed with 2 parts by weight of PVA, and the resulting mixture was spray-dried to obtain a molding powder. The molding powder was formed by means of a rubber press under a pressure of 150 MPa and then calcined for 3 hours in the presence of atmospheric air at the temperature shown in Table 7 to obtain an alumina-zirconia sintered body.

TABLE 7

| | Compounding ratio (parts by weight) | | | |
|---|---|---|---|---|
| | Al$_2$O$_3$ powder | Intermediate ZrO$_2$ mixture powder | Kaolinite | Calcining temperature (° C.) |
| Comparative Example 7 | 59.2 | 40 | 2.1 | 1300 |
| Example 13 | 59.2 | 40 | 2.1 | 1400 |
| Example 14 | 59.2 | 40 | 2.1 | 1450 |
| Example 15 | 59.2 | 40 | 2.1 | 1500 |
| Example 16 | 59.2 | 40 | 2.1 | 1600 |

Subsequently, formulation of the alumina-zirconia sintered body, content of the tetragonal ZrO$_2$ crystal, mean particle diameter of Al$_2$O$_3$ crystal, relative density and abrasion volume were measured in the same manner as in Example 1. The results are summarized in Table 8. The mean particle diameter of Al$_2$O$_3$ crystal was determined according to the method mentioned in "Ceramic Science Series, 8, Ceramic Processing", page 195, published by Gihodo Shuppan K. K., namely by a method of regarding the Al$_2$O$_3$ particles as an assembly of spheres having a uniform diameter and multiplying the mean code length by 1.5.

TABLE 8

| | Composition of alumina-zirconia sintered body (parts by weight) | | | Content of tetragonal ZrO$_2$ crystal in ZrO$_2$ crystal (%) | Mean crystal particle diameter of Al$_2$O$_3$ ($\mu$m) | Relative density (%) | Abrasion volume of pins | Abrasion volume of liners |
|---|---|---|---|---|---|---|---|---|
| | Al$_2$O$_3$ | ZrO$_2$ | SiO$_2$ | | | | | |
| Comparative Example 7 | 60 | 40 | 1 | 46 | 0.5 | 78.5 | (Note 2) | (Note 2) |
| Example 13 | 60 | 40 | 1 | 82 | 0.6 | 95.1 | 0.42 | 0.63 |
| Example 14 | 60 | 40 | 1 | 90 | 0.8 | 96.9 | 0.32 | 0.46 |
| Example 15 | 60 | 40 | 1 | 94 | 1.0 | 98.3 | 0.30 | 0.44 |
| Example 16 | 60 | 40 | 1 | 98 | 2.5 | 97.0 | 0.40 | 0.60 |

(Note 2) Unmeasurable due to breakage during the test

It is apparent from Tables 3, 4, 6 and 8 that the alumina-zirconia sintered bodies of the present invention give an abrasion volume of 0.42 or less, and are superior to the alumina-zirconia sintered bodies of Comparative Examples.

The alumina-zirconia sintered body according to Example 1 is excellent in abrasion resistance, and suitable for use in apparatuses for treating powder materials as a part coming into contact with powder materials.

The process for producing an alumina-zirconia sintered body according to the present invention makes it possible to produce an alumina-zirconia sintered body excellent in abrasion resistance.

The impact grinder according to the present invention is excellent in abrasion resistance.

What is claimed is:

1. An impact grinder comprising a cylinder and a plurality of pins fixed on a rotating plate rotating at a high speed in the cylinder so as to pulverize and mix a powdery material by collision against an inner wall of the cylinder and the pins, wherein an alumina-zirconia sintered body comprising a composition of aluminum oxide in an amount of 92–35% by weight, zirconium oxide in an amount of 8–65% by weight, a crystal system of the zirconium oxide being predominantly tetragonal, and silicon oxide in an amount of 0.2–5 parts by weight per 100 parts by weight of the total of the aluminum oxide and zirconium oxide crystal, and having a relative density of 95% or more, is used as a material constructing at least one of (a) portions of the cylinder coming into contact with the powdery material and (b) the pins.

2. The impact grinder according to claim 1, wherein said sintered body includes at least mullite obtained by sintering kaolinite.

3. The impact grinder according to claim 1, wherein said sintered body includes mullite and cristobalite obtained by sintering kaolinite.

4. The impact grinder according to claim 3, wherein the sintered body consists essentially of the aluminum oxide, the zirconium oxide and the silicon oxide.

5. The impact grinder according to claim 1, wherein the sintered body consists essentially of the aluminum oxide, the zirconium oxide and the silicon oxide.

6. A process of using an impact grinder having a cylinder and a plurality of pins fixed on a rotating plate rotating at a high speed in the cylinder, comprising contacting a powdery material with said impact grinder so as to pulverize and mix the powdery material by collision against an inner wall of the cylinder and the pins, wherein portions of the impact grinder contacting the powdery material are made of an alumina-zirconia sintered body, comprised of a composition of aluminum oxide in an amount of 92–35% by weight, zirconium oxide in an amount of 8–65% by weight, a crystal system of the zirconium oxide being predominantly tetragonal, and silicon oxide in an amount of 0.2–5 parts by weight per 100 parts by weight of the total of the aluminum oxide and zirconium oxide crystal, and having a relative density of 95% or more.

7. The process according to claim 6, wherein said sintered body includes at least mullite obtained by sintering kaolinite.

8. The process according to claim 6, wherein said sintered body includes mullite and cristobalite obtained by sintering kaolinite.

9. The process according to claim 8, wherein the sintered body consists essentially of the aluminum oxide, the zirconium oxide and the silicon oxide.

10. The process according to claim 6, wherein the sintered body consists essentially of the aluminum oxide, the zirconium oxide and the silicon oxide.

* * * * *